Jan. 17, 1928. 1,656,771
R. W. A. BREWER
CONSTRUCTION AND MOUNTING OF A VALVE MECHANISM FOR
INTERNAL COMBUSTION ENGINES
Filed March 9, 1925
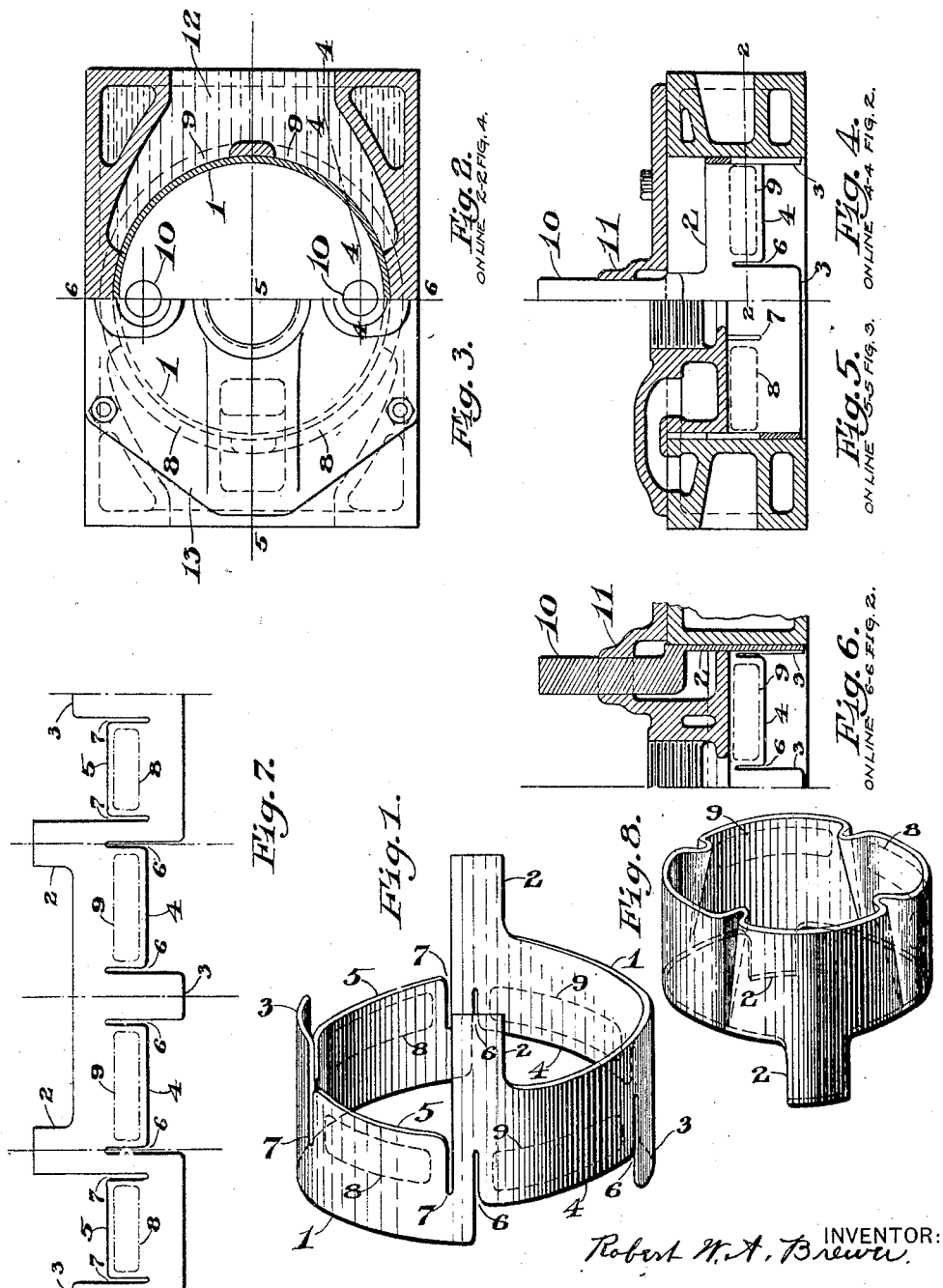
INVENTOR:
Robert W. A. Brewer.
BY
ATTORNEYS.

Patented Jan. 17, 1928.

1,656,771

UNITED STATES PATENT OFFICE.

ROBERT W. A. BREWER, OF PHILADELPHIA, PENNSYLVANIA, ASSIGNOR TO HAROLD F. PITCAIRN, OF BRYN ATHYN, PENNSYLVANIA.

CONSTRUCTION AND MOUNTING OF A VALVE MECHANISM FOR INTERNAL-COMBUSTION ENGINES.

Application filed March 9, 1925. Serial No. 13,990.

The main objects of my present invention are to provide a light and flexible sleeve valve for an internal combustion engine which has limited local radial freedom of movement sufficient to permit the material of which it is formed flexing elastically, so as to conform closely to the outer edges of the ports which are covered by this valve when pressure exists in the combustion chamber of the engine. This flexibility in my construction is controlled and limited so as to reduce the static friction, which is set up in some forms of completely flexible split valves in which the split passes entirely along the axial length of the valve, so that the divided ends have free movement as in the conventional Ramsbottom piston ring. In order to overcome certain objections to a totality of free movement, objections arising principally from uncontrolled friction caused by internal pressure, I prefer in this invention to provide slits of limited extent located close to those portions of the valve which pass across the ports in the cylinder walls. In a valve constructed in accordance with this invention there is a complete circumferential continuity of material forming an inextensible body constituting the valve and of limited width, the magnitude of which is determined by the particular construction and design of the adjacent mechanisms. Associated with this band or body are tongue pieces depending therefrom on one or both sides of the circumferential axis thereof, which tongue pieces control the segmental valve ports in the cylinder head of the engine. The amount of flexibility permitted to any one of these tongue pieces is governed by the extent of the length of the slits bounding them and the total flexibility permitted should not be sufficient to enable the tongue pieces to be sucked away from the bounding walls under such sub-atmospheric pressures as may exist when, for example, the engine is working under closely throttled conditions. Attention is here drawn to the tendency of the completely slit valve to give unsatisfactory results under such condition of working and when a completely split valve is not firmly supported against leaving the cylinder wall, it may easily do so and permit exhaust gases to be drawn back into the engine cylinder during the suction stroke of the engine, when the throttle valve on the carburetor is almost closed. My invention is therefore particularly directed to prevent this occurring and sufficient support is given to the tongue pieces by the circumferential band of material to prevent their flexing undesirably.

In some forms of split cuff valves, particularly when they are short in an axial direction, there is a tendency for the said valves to warp or twist so that their proper functioning is impaired. In the novel construction which I have devised, a continuity of material in circumferential direction is at all times maintained and the necessary slits to provide flexibility do not completely transverse the material in any one direction. In carrying this invention into effect, I prefer to employ a light cylindrical construction, so disposed within the combustion chamber of an internal combustion engine, as to reciprocate axially therein and to control the segmental ports provided in the combustion chamber either by passing over the edges of the ports or engaging openings in the said valve, which register with the ports at predetermined positions of the valve in the combustion chamber.

This invention particularly relates to novel means for insuring closeness of fit between those portions of the valve which cover the ports in their closed positions and the walls of the combustion chamber adjacent to the edges of the said ports. The construction adopted renders flexible such portions of the said valves which become operative when the ports are covered by the valve and this flexibility is obtained in the manner hereinafter described.

Although this method of partial slitting of the valve will give satisfactory results in practice, I do not specifically confine my invention to this method of affording local flexibility to portions of the sleeve valve and similar results can be obtained by providing short and graduated local corrugations. There are, however, certain practical disadvantages in the use of such corrugations but satisfactory results can be achieved by this construction also if preferred.

For the purpose of illustrating my invention, I have shown in the accompanying drawings forms thereof which are at present preferred by me, since they will give in practice satisfactory and reliable results although it is to be understood that the various instrumentalities of which my invention consists can be variously arranged and organized and that my invention is not limited to the precise arrangement and organization of these instrumentalities as herein shown and described.

Referring now to the drawings:—

Figure 1 shows a perspective view of one form of the valve made in accordance with this invention.

Figure 2 is a section on line 2—2 of Figure 4.

Figure 3 is a plan of the cylinder head.

Figure 4 is a section on line 4—4 of Figure 2.

Figure 5 is a section on line 5—5 of Figure 3.

Figure 6 is a section on line 6—6 of Figure 2.

Figure 7 is a projection of the valve shown in Figure 1.

Figure 8 is a perspective view of another form of valve, corrugated.

The same numbers indicate similar parts on the various drawings in which, referring first to Fig. 1, 1 indicates the body of my novel valve which is made of comparatively thin material. 2—2 are diametrically opposed lugs or extensions forming means for attachment of the valve to its operating mechanism, for example, push rods. 3—3 are upper and lower short, vertical tongues or extensions serving to guide the valve as it reciprocates in the cylinder head. 4 indicates one portion or the bottom lips of the valve, each of which serves to cover one port which in the closed position is indicated by the dotted lines 9 (see Fig. 1). The neighboring tongue piece is bounded by the slits or saw cuts 6—6, which release this segment from restraint of the main body of the valve 1, and permit it to adjust itself into close proximity with the cylinder wall when pressure is inside the cylinder as, for example, during the working stroke of the engine.

It will readily be seen that the construction shown, which will be clearly understood from Figs. 1 and 7, permits appreciable latitude in the closeness of fit of this valve in the cylindrical portion of the combustion chamber and that vertical movement of the valve as a whole displaces the edge 4, across the port 9, thereby opening a passageway between the combustion chamber and the gas port. In the construction shown on Fig. 1, those parts of the valve lying to the right of the center line perform similar functions, operating, for example, across the inlet ports. On the left of the center line, 5 indicates the closure edge of a tongue piece which is bounded by slits 7—7 controlling a port indicated by the dotted line 8. A downward movement of the valve causes the upper edge 5, to pass across the port 8, and open communication between the cylinder and the exhaust passages, the slits 7 rendering flexible the segment which they bound, insuring gas tightness when in the closed position under the influence of internal pressure.

The operating rod 10, is attached to the extension of the valve 2, by riveting, welding or other suitable means and is guided in the guide 11, forming part of or attached to the cylinder head or the closure plug according to the particular detail construction, which may be desired. In the construction shown in Figures 2, 3 and 4, the inlet ports are on one side of the center line and the exhaust ports on the other side, but any suitable arrangement of ports can be controlled by a valve made in accordance with this invention. In the construction shown in Fig. 8 I have shown a comparatively thin cylindrical valve member which is provided with longitudinally extending corrugations shown in the present instance as being four in number, but which number can obviously be increased or diminished according to requirements, said corrugations being so disposed as to render slightly flexible the portions of the valve walls operative about the port openings.

It will now be apparent that I have devised a novel and useful construction and mounting of a valve mechanism for internal combustion engines which embodies the features of advantage enumerated as desirable in the statement of the invention and the above description, and while I have, in the present instance, shown and described preferred embodiments thereof which will give in practice satisfactory and reliable results, it is to be understood that the same are susceptible of modification in various particulars without departing from the spirit or scope of the invention or sacrificing any of its advantages.

Having thus described my invention what I claim as new and desire to secure by Letters Patent, is:—

1. In an internal combustion engine, a power cylinder, segmental inlet and exhaust ports within the said cylinder at the head thereof, a comparatively thin cylindrical valve member adapted to cover said ports, said valve member being provided with corrugations adjacent to those portions thereof operative about said port openings, and said corrugations being so disposed as to render slightly flexible the aforesaid portions of the valve walls and means for reciprocating said valve.

2. In an internal combustion engine, a power cylinder, a combustion chamber, segmental inlet and exhaust ports within said cylinder at the head thereof, a comparatively thin sleeve valve element adapted to open and close communication between said ports and the combustion chamber, said valve being a complete cylinder and provided with means rendering its walls slightly flexible locally and circumferentially, said means comprising locally disposed corrugations through portions of the material adjacent to the inlet and exhaust ports and means for operating the valve.

3. In an internal combustion engine, a power cylinder, a combustion chamber, segmental inlet and exhaust ports within said cylinder at the head thereof, a comparatively thin sleeve valve element adapted to open and close communication between said ports and combustion chamber, said valve being a complete cylinder and provided with means rendering it slightly flexible locally and circumferentially, said means comprising locally disposed corrugations through portions of the material adjacent to the inlet and exhaust ports and means for operating the valve.

ROBERT W. A. BREWER.